United States Patent
Bürger

[19]

[11] Patent Number: 6,116,111

[45] Date of Patent: Sep. 12, 2000

[54] LONGITUDINAL ADJUSTER ON THE CORE OF AN ACTUATING-PULL MECHANISM

[75] Inventor: Arnd Bürger, Einbeck, Germany

[73] Assignee: United Parts FHS Automobil Systeme GmbH, Dassel, Germany

[21] Appl. No.: 09/229,078

[22] Filed: Jan. 12, 1999

[30] Foreign Application Priority Data

Jan. 13, 1998 [DE] Germany .................. 198 00 850

[51] Int. Cl.[7] .................................................. F16C 1/22
[52] U.S. Cl. ............................. 74/501.5 R; 74/502.4; 74/502.6; 403/105; 24/585
[58] Field of Search ................ 74/501.5 R, 502.4, 74/502.6; 403/104, 105; 24/584, 585

[56] References Cited

U.S. PATENT DOCUMENTS

| | | | |
|---|---|---|---|
| 4,598,809 | 7/1986 | Glover et al. .................. | 74/501.5 R |
| 4,751,851 | 6/1988 | Deligny et al. ................. | 74/501.5 R |
| 4,936,161 | 6/1990 | Polando ........................ | 74/502.4 |
| 4,955,252 | 9/1990 | Clissett et al. ................. | 74/502.4 |
| 5,280,733 | 1/1994 | Reasoner ...................... | 74/502.6 |
| 5,383,377 | 1/1995 | Boike .......................... | 74/502.6 |
| 5,435,203 | 7/1995 | Spease et al. ................. | 74/501.5 R |
| 5,560,261 | 10/1996 | Kitamura ..................... | 74/502.6 |
| 5,605,074 | 2/1997 | Hall et al. .................... | 74/502.6 |
| 5,653,148 | 8/1997 | Reasoner ...................... | 74/502.6 |

FOREIGN PATENT DOCUMENTS 0 619 437  10/1994  European Pat. Off. .

Primary Examiner—David A. Bucci
Assistant Examiner—Chong H. Kim
Attorney, Agent, or Firm—Cohen, Pontani, Lieberman & Pavane

[57] ABSTRACT

A longitudinal adjuster on the core or shaft of an actuating-pull mechanism, preferably for gear-shift cables of motor vehicles. For the purpose of adjusting force transmission, two shaped parts with toothing arrangements interengage. The two shaped parts are arranged in a housing with a securing sleeve and a compression spring. The compression spring acts along the axis of the core or shaft. The shaped parts are of trapezoidal design in cross section and are fixed via noses which are arranged on the outer of the shaped parts and the securing sleeve.

12 Claims, 2 Drawing Sheets

LONGITUDINAL ADJUSTER ON THE CORE OF AN ACTUATING-PULL MECHANISM

BACKGROUND OF THE INVENTION

1. Field of the Invention

The invention relates to a longitudinal adjuster on the core or shaft of an actuating-pull mechanism, preferably for gear-shift cables of motor vehicles, in accordance with the first patent claim.

The invention can be used wherever it is intended to transmit forces or movements between components by means of actuating-pull mechanisms and the components vary slightly in length in relation to one another, with the result that the length of the actuating-pull mechanism has to be corrected. This can be the case in all types of vehicles and the actuating means thereof, such as shifting mechanisms, in particular gear-shift mechanisms or clutches. Furthermore, wear on the connecting parts of the actuating-pull mechanism or of the components makes it necessary to correct the actuating-pull mechanism. This can be done in a known manner by correcting the length of the sheathing or correcting the effective length of the core.

2. Discussion of the Prior Art

European reference EP 0 619 437 discloses a device which is intended for adjusting the length of a core of a cable and in the case of which two toothing arrangements interengage. An adjustable resilient element acts transversely with respect to the axis of the core. As a result, the effective length of the core can be changed as desired. In the operating state, automatic readjustment and securing do not take place. Furthermore, the system does not appear to be suitable for the purpose of transmitting relatively large forces.

A further system is known, having an inner shaped part and an outer shaped part with teeth that interengage. The inner shaped part is fixedly connected to the core and the outer shaped part is pushed over the inner shaped part in a wedge-like manner. The outer shaped part in each case has to be disengaged to an extent where a surface without any toothing arrangement is reached, whereupon the outer shaped part can be displaced with respect to the inner shaped part until the two parts latch into one another again and thus produce a corresponding connection. This longitudinal adjuster has the disadvantage that the toothing arrangements have to be released from one another over their entire length, with the result that a long displacement path is required for the disengagement of the toothing arrangements. Furthermore, problems may arise during the engagement of the toothing arrangements if the latter strike against one another by way of their tips and jam.

SUMMARY OF THE INVENTION

The object of the present invention is thus to eliminate the shortcomings of the prior art and to provide a longitudinal adjuster in which automatic readjustment and securing take place in the operating state. It is a further objective to provide an adjuster that can transmit relatively large forces and be quickly and reliably adjustable.

Pursuant to this object, and others which will become apparent hereafter, one aspect of the present invention resides in a longitudinal adjuster in which the adjustment of the force transmission is carried out by an inner shaped part and an outer shaped part which are parallel to one another, have identically configured toothing arrangements and are arranged in a housing with a securing sleeve and a compression spring. The compression spring acts, and is arranged, along the axis of the core of an actuating-pull mechanism.

In another embodiment the compression spring is a metal helical spring.

The compression spring can be fixedly connected to the securing sleeve or to the housing. A combination of both these possibilities is also possible. This has the advantage of rendering the assembly of the longitudinal adjuster more favorable.

It is essential to the invention that the parallel shaped parts with their identically configured toothing arrangements are of trapezoidal configuration in cross section. This has the advantage that the toothing arrangements only have to be disengaged, and moved, over a very small distance in order for the core and housing part to separate and to allow displacement between the two parts.

In another embodiment of the invention, the two shaped parts are provided with a sawtooth-like, pointed toothing arrangement.

In still a further embodiment, noses are arranged on the outer shaped part which, in the open and delivery state of the longitudinal adjuster, keep the compression spring closed between the securing sleeve and the top part of the housing.

Wedge-shaped noses are arranged on the securing sleeve which, by way of the compression spring, can act on the noses of the outer shaped part and, as a result, can connect the outer shaped part to the inner shaped part.

The longitudinal adjuster according to the invention has the advantage that, in relation to the prior art, the bracing displacement of the interengaging parts is reduced since it is no longer necessary for these to be disengaged over the entire area of overlap, as a result of which the mechanism is a more space-saving one, this making it more versatile. Furthermore, the longitudinal adjuster according to the invention allows automatic readjustment and securing in the operating state and can transmit higher forces than is the case with prior-art longitudinal adjusters. It should also be noted that there is improved introduction of the tooth contour during locking, the introduction operation being less critical and increased operational reliability being achieved.

The various features of novelty which characterize the invention are pointed out with particularity in the claims annexed to and forming a part of the disclosure. For a better understanding of the invention, its operating advantages, and specific objects attained by its use, reference should had to the drawing and descriptive matter in which there are illustrated and described preferred embodiments of the invention.

DETAILED DESCRIPTION OF THE PREFERRED EMBODIMENTS

Figure 1:
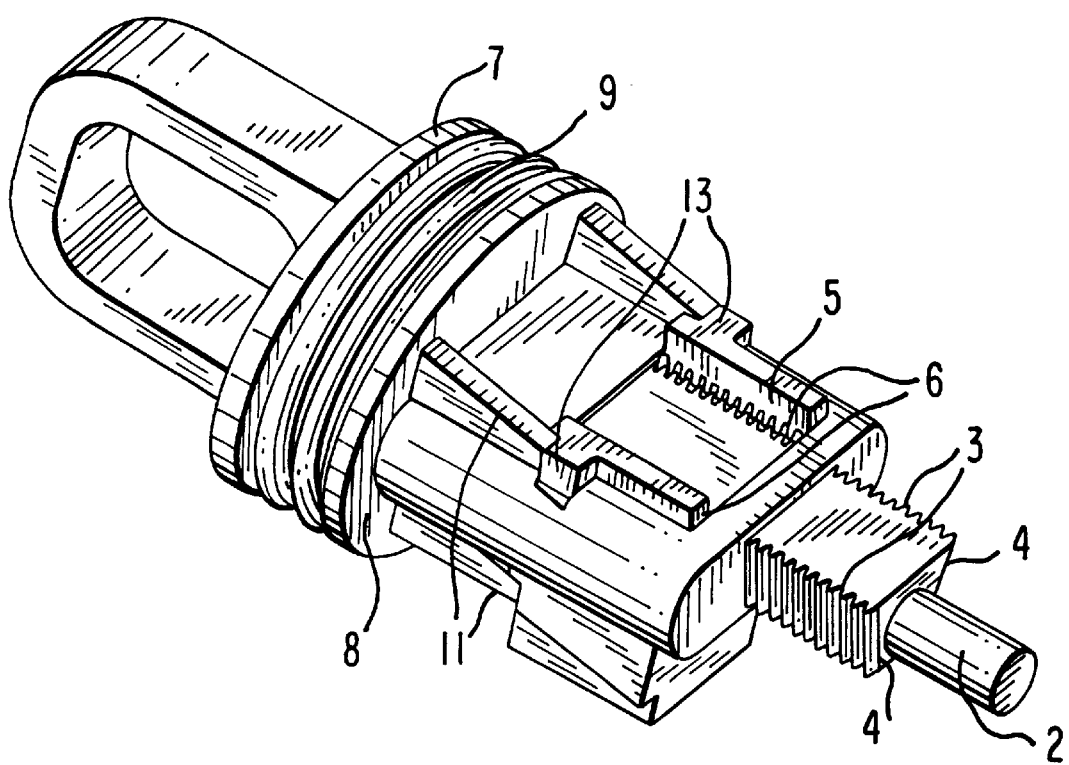
FIG. 1 shows the inventive longitudinal adjuster in the open state of the shaped parts.
Figure 2:
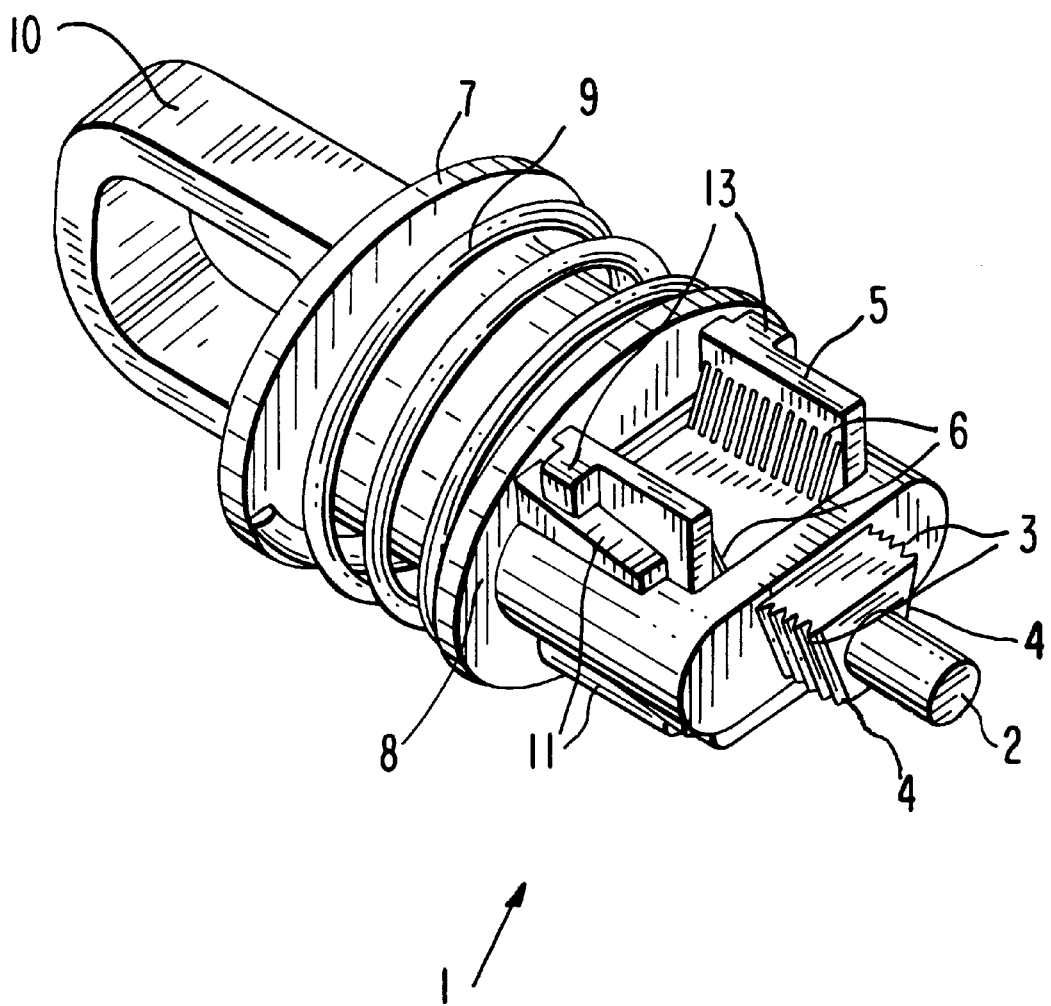
FIG. 2 shows the longitudinal adjuster in the closed state.

FIG. 1 shows a longitudinal adjuster 1 in the open state of the shaped parts 4,5, that is to say in the delivery state. The longitudinal adjuster 1 is fastened on an appropriate component by way of its connecting eyelet 10 and connects the component to the core or shaft 2 of an actuating-pull mechanism. An inner shaped part 4 with a toothing arrangement 3 is arranged on the core 2 of the actuating-pull mechanism, the toothing arrangement 3 being of sawtooth-like design. In the delivery state, the toothing arrangement 3 of the inner shaped part 4 is unlatched from the toothing arrangement 6 of the outer shaped part 5 and can be displaced with respect to the same. In the delivery state, the metal compression spring 9 between the securing sleeve 8 and the housing part 7 is subjected to stressing and forces the nose 11 of the securing sleeve 8 against the nose 13 of the outer shaped part 5. In this initial position, the core 2 and housing 7 can be displaced axially with respect to one another, with the result that the effective length of the core 2 can be adjusted. As soon as adjustment has taken place, the outer shaped part 5 can be latched into the inner shaped part 4 by way of its toothing arrangement 6. This takes place by a force acting against one side of the outer shaped part 5. As a result, the outer shaped port 5 is pushed upward and the nose 13 of the outer shaped part 5 is pushed outward until, by virtue of the compression spring 9 being relieved of stressing, the nose 11 of the securing sleeve 8 is clipped beneath the nose 13 of the outer shaped part 5. As a result, the two shaped parts 4,5 are connected to one another in a positively locking manner. The securing sleeve 8 secures the outer shaped part 5 against unintended release. At the same time the spring 9 allowvs automatic readjustment of the bracing system. For release purposes, the securing sleeve 8 is pushed back counter to the spring force and the outer shaped part 5 is forced into the initial position. The longitudinal adjuster 1 is thus free for renewed adjustment.

The invention is not limited by the embodiments described above which are presented as examples only but can be modified in various ways within the scope of protection defined by the appended patent claims.

I claim:

1. A longitudinal adjuster for use on a core of an actuating-pull mechanism, comprising:

a housing;

a securing sleeve slidably mounted on the housing;

compression spring means arranged between the housing and the sleeve for acting on the sleeve in a longitudinal direction of the core;

an inner shaped part having a toothing arrangement; and an outer shaped part having a toothing arrangement, the two shaped parts being arranged in the housing so as to be parallel to one another so that the toothing arrangements are engagable and disengagable from one another in response to force of the spring means, the parallel shaped parts with toothing arrangements being trapezoidal in cross-section.

2. A longitudinal adjuster as defined in claim 1, and further comprising noses arranged on the outer shaped part so that in an open state of the longitudinal adjuster the noses keep the compression spring stressed.

3. A longitudinal adjuster as defined in claim 2, and further comprising wedge-shaped noses arranged on the securing sleeve so as to engage the noses of the outer shaped part so that by way of the compression spring the wedge-shaped noses act on the noses of the outer shaped part and, by way of force of the compression spring, connect the outer shaped part to the inner shaped part.

4. A longitudinal adjuster as defined in claim 1, wherein the toothing arrangements of the shaped parts are pointed.

5. A longitudinal adjuster as defined in claim 1, wherein the compression spring is fixed to the securing sleeve.

6. A longitudinal adjuster as defined in claim 1, wherein the compression spring is fixed to the housing.

7. A longitudinal adjuster as defined in claim 1, wherein the compression spring is integral with the securing sleeve.

8. A longitudinal adjuster for use on a core of an actuating-pull mechanism, comprising:

a housing;

a securing sleeve slidably mounted on the housing;

compression spring means arranged between the housing and the sleeve for acting on the sleeve in a longitudinal direction of the core;

an inner shaped part having a toothing arrangement;

an outer shaped part having a toothing arrangement, the two shaped parts being arranged in the housing so as to be parallel to one another so that the toothing arrangements are engagable and disengagable from one another in response to force of the spring means; noses arranged on the outer shaped part so that in an open state of the longitudinal adjuster the noses keep the compression spring stressed; and wedge-shaped noses arranged on the securing sleeve so as to engage the noses of the outer shaped part so that by way of the compression spring the wedge-shaped noses act on the noses of the outer shaped part and, by way of force of the compression spring, connect the outer shaped part to the inner shaped part.

9. A longitudinal adjuster as defined in claim 8, wherein the toothing arrangements of the shaped parts are pointed.

10. A longitudinal adjuster as defined in claim 8, wherein the compression spring is fixed to the securing sleeve.

11. A longitudinal adjuster as defined in claim 8, wherein the compression spring is fixed to the housing.

12. A longitudinal adjuster as defined in claim 8, wherein the compression spring is integral with the securing sleeve.

* * * * *